United States Patent
Lection et al.

(10) Patent No.: US 8,544,005 B2
(45) Date of Patent: Sep. 24, 2013

(54) AUTONOMIC METHOD, SYSTEM AND PROGRAM PRODUCT FOR MANAGING PROCESSES

(75) Inventors: David B. Lection, Raleigh, NC (US); Mohamad R. Salahshoor, Raleigh, NC (US); Balan Subramanian, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 1754 days.

(21) Appl. No.: 10/695,056

(22) Filed: Oct. 28, 2003

(65) Prior Publication Data

US 2005/0091654 A1    Apr. 28, 2005

(51) Int. Cl.
    *G06F 9/46*      (2006.01)
(52) U.S. Cl.
    USPC ............................................. 718/100
(58) Field of Classification Search
    USPC ............................................. 718/100
    See application file for complete search history.

(56) References Cited

U.S. PATENT DOCUMENTS

| | | | | |
|---|---|---|---|---|
| 5,473,773 | A * | 12/1995 | Aman et al. | 718/104 |
| 5,809,492 | A * | 9/1998 | Murray et al. | 706/45 |
| 5,996,013 | A * | 11/1999 | Delp et al. | 709/226 |
| 6,076,174 | A * | 6/2000 | Freund | 714/47 |
| 6,665,716 | B1 * | 12/2003 | Hirata et al. | 709/224 |
| 7,140,020 | B2 * | 11/2006 | McCarthy et al. | 718/104 |
| 2002/0135611 | A1 * | 9/2002 | Deosaran et al. | 345/738 |
| 2003/0135580 | A1 * | 7/2003 | Camble et al. | 709/216 |
| 2003/0149685 | A1 * | 8/2003 | Trossman et al. | 707/2 |
| 2004/0111509 | A1 * | 6/2004 | Eilam et al. | 709/224 |

\* cited by examiner

*Primary Examiner* — Mengyao Zhe
(74) *Attorney, Agent, or Firm* — Steven M. Greenberg, Esq.; Carey, Rodriguez, Greenberg & O'Keefe

(57) ABSTRACT

An improved solution for managing processes. In particular, resources are allocated to processes based on a determination of the available resources and an anticipated benefit for each process. The anticipated benefit can be derived from a current status of the process (e.g., lagging or accelerated) and/or benefit knowledge learned from past executions of the process using diverse resource sets. One or more additional attributes, such as resource dependency between processes, can also be considered before allocating resources.

18 Claims, 5 Drawing Sheets

| | PROCESS ID | RESOURCE A | RESOURCE B | RESOURCE C | IMPROVEMENT |
|---|---|---|---|---|---|
| 48A → | SUB-PROCESS 40A | 5 | 2 | 1 | 200% |
| 48B → | SUB-PROCESS 40B | 9 | 8 | 8 | 150% |
| 48C → | SUB-PROCESS 40A | 9 | 2 | 1 | 250% |
| 48D → | SUB-PROCESS 40A | 10 | 1 | 0 | 50% |

FIG. 4

| PROCESS ID | RESOURCE A | RESOURCE B | RESOURCE C | IMPROVEMENT |
|---|---|---|---|---|
| SUB-PROCESS 40A | 5 | 2 | 1 | 200% |
| SUB-PROCESS 40B | 9 | 8 | 8 | 150% |
| SUB-PROCESS 40A | 9 | 2 | 1 | 250% |
| SUB-PROCESS 40A | 10 | 1 | 0 | 50% |

US 8,544,005 B2

AUTONOMIC METHOD, SYSTEM AND PROGRAM PRODUCT FOR MANAGING PROCESSES

BACKGROUND OF THE INVENTION

1. Technical Field

The invention relates generally to managing processes, and more specifically, to an autonomic solution that allocates resources to a process based on the resources available and an anticipated benefit for the process.

2. Background Art

In systems executing multiple processes, it is frequently desired to dynamically allocate resources (e.g., CPUs, CPU time, memory, storage, bandwidth, etc.) to one or more of the processes. For example, a process may be running behind a target schedule ("lagging"). In order to assist the process in getting back on schedule, additional resources can be dynamically allocated to the process so that it executes faster. Currently, processes are generally assigned to a particular "service class" for the allocation of resources. Each service class indicates a priority with which the corresponding process is assigned resources. For example, a service class can indicate an execution priority for a given process (e.g., high, normal, low). In this solution, a high priority process is given resource preference over a normal priority process which in turn is given resource preference over a low priority process. The allocation of resources can be dynamically altered by allowing each process to change its service class. As a result, a lagging process can request that its service class be increased, so that it is given a higher resource preference.

However, the service class solution has several limitations. For example, the change in service class is often made on a process by process basis. As a result, other processes competing for resources and/or other processes that are held up by a particular process are not considered in the resource allocation. Further, the additional resources are frequently allocated to a process without considering whether the additional resources will be effective in improving the performance of the process or whether another process may benefit more from the resources. Additionally, the service class solution at least implicitly assumes that additional resources will always be available. This assumption is especially troublesome when a system experiences a high demand for its resources. In this situation, many processes may start to lag, which can eventually result in the service class for all processes being raised, without improving any of the lagging processes.

As a result, a need exists for an improved method, system and program product for managing processes. In particular, a need exists for an autonomic solution that allocates resources based on the resources available, and an anticipated benefit for the various processes sharing the resources.

SUMMARY OF THE INVENTION

The invention provides a method, system and program product for managing processes. To this extent, the invention seeks to more effectively allocate resources so that a more beneficial performance improvement is achieved for the processes. Specifically, under the present invention, resources are dynamically allocated to processes based on a set of available resources and an anticipated benefit for each process. For example, a set of available resources can be identified, and an anticipated benefit that each process would obtain from the set of available resources can be determined. The anticipated benefit can be based on actual performance improvements that were obtained from one or more previous allocations of the same or similar set of available resources to the process and stored in a benefit knowledge base. In this manner, the invention provides an autonomic solution that learns how best to allocate resources as they are used by various processes over time. Some or all of the available resources can then be allocated to one or more of the processes that should yield the most improvement based on the previous performance improvements. All processes or a subset of processes can be considered to receive the set of available resources. For example, a set of lagging processes can be determined, and the set of available resources can be allocated to one or more lagging processes that should yield the most improvement. As a result, the invention provides an improved solution for allocating available resources to one or more processes.

A first aspect of the invention provides a method of managing processes, the method comprising: determining a set of available resources; determining a set of lagging processes; and determining an anticipated benefit for the set of available resources for each process in the set of lagging processes.

A second aspect of the invention provides a method of managing processes, the method comprising: determining a set of available resources; determining an anticipated benefit for the set of available resources for each process based on learned benefit knowledge; and allocating at least some of the set of available resources to a process based on the anticipated benefits.

A third aspect of the invention provides a system for managing processes, the system comprising: a resource system for determining an availability of resources; a benefit system for determining an anticipated benefit for each process based on a set of available resources and learned benefit knowledge; and an allocation system for allocating resources to processes based on the anticipated benefits.

A fourth aspect of the invention provides a program product stored on a recordable medium for managing processes, which when executed comprises: program code for determining an availability of resources; program code for determining an anticipated benefit for each process based on a set of available resources and learned benefit knowledge; and program code for allocating the set of available resources to a process based on the anticipated benefits.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings in which:

FIG. 4 shows illustrative entries in a benefit knowledge database according to one embodiment of the invention.

Figure 1:
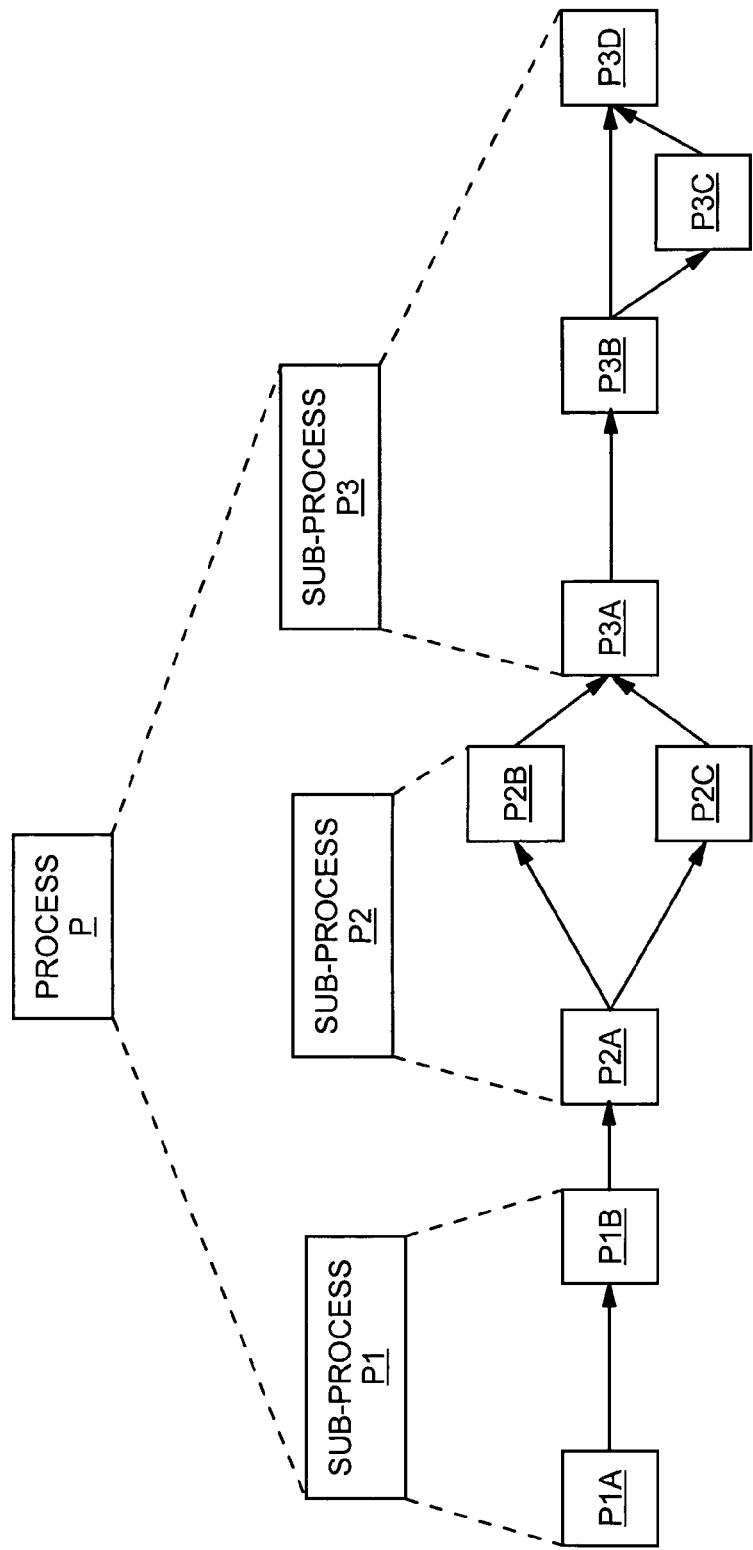
FIG. 1 shows an illustrative process including multiple sub-processes.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the invention provides a method, system and program product for managing processes. To this extent, the invention seeks to more effectively allocate resources so that a more beneficial performance improvement is achieved for the processes. Specifically, under the present invention, resources are dynamically allocated to processes based on a set of available resources and an anticipated benefit for each process. For example, a set of available resources can be identified, and an anticipated benefit that each process would obtain from the set of available resources can be determined. The anticipated benefit can be based on actual performance improvements that were obtained from one or more previous allocations of the same or similar set of available resources to the process and stored in a benefit knowledge base. In this manner, the invention provides an autonomic solution that learns how best to allocate resources as they are used by various processes over time. Some or all of the available resources can then be allocated to one or more of the processes that should yield the most improvement based on the previous performance improvements. All processes or a subset of processes can be considered to receive the set of available resources. For example, a set of lagging processes can be determined, and the set of available resources can be allocated to one or more lagging processes that should yield the most improvement. As a result, the invention provides an improved solution for allocating available resources to one or more processes.

It is understood that the term "resource," as used throughout this discussion, means any type of physical or virtual computing equipment, time allotment, etc. that is used by a process when executing and can be shared by one or more processes. To this extent, a resource can comprise a number of and/or an amount of time on a processing unit (e.g., CPU, math coprocessor, graphics coprocessor), an amount of a particular type of memory (e.g., cache, main memory, virtual memory), access to one or more I/O or storage devices, an amount of bandwidth for communicating over a particular communications link, etc. Further, it is understood that the term "set" is used to denote "one or more" of a particular object.

It is also understood that the term "process" is used generically, and can comprise, for example, a job that includes numerous processes, a process that includes several sub-processes, an individual process or sub-process, etc. To this extent, each process can be defined using any standard process definition language (e.g., Business Process Execution Language (BPEL)). Commonly, the definition of a process includes, among other things, a desired execution period (e.g., a normal execution duration), as well as a set of required resources for executing the process. Other information, such as a type of process (e.g., computational, extensive I/O, etc.) can be included or derived from the process definition (e.g., set of required resources).

As mentioned, a typical process can include one or more sub-processes. For example, FIG. 1 shows an illustrative process P that includes three sub-processes P1-3. Further, each sub-process P1-3 is shown including a plurality of sub-processes (e.g., sub-processes P3A-D of sub-process P3). As shown, a sub-process may require that one or more sub-processes complete before it can execute. Similarly, multiple sub-processes may not be able to start executing until a particular sub-process completes. For example, sub-process P1B must wait for sub-process P1A to complete executing before it starts to execute, sub-processes P2B-C must wait for sub-process P2A to complete executing before they can start executing, etc. It is understood that various numbers of processes, sub-processes, etc. as well as dependencies between processes and sub-processes are possible as is known in the art.

Figure 2:
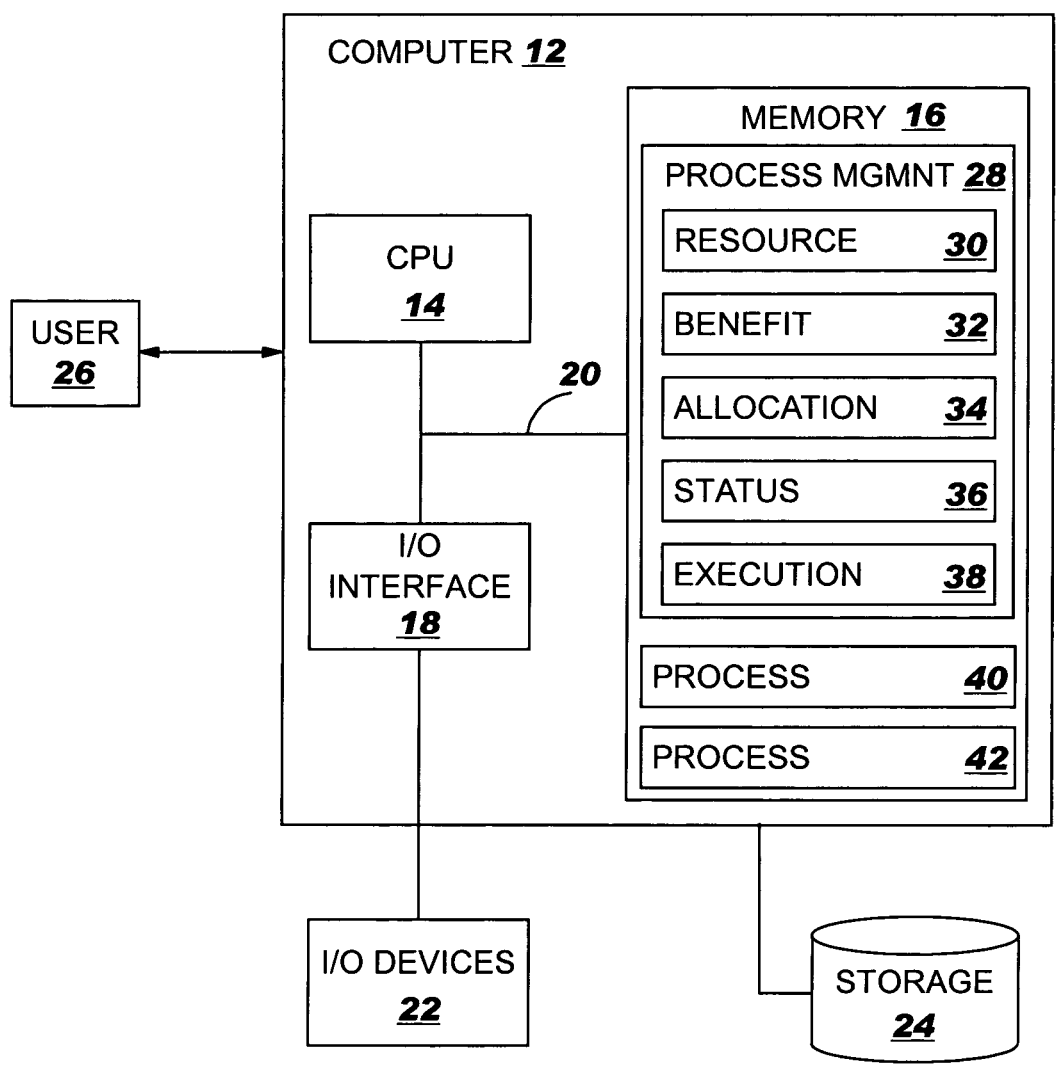
FIG. 2 shows an illustrative system for managing processes according to one embodiment of the invention.

In general, the invention provides an improved solution for allocating shared resources among the various processes and sub-processes. FIG. 2 shows a system 10A for managing processes 40, 42 executing on, for example, computer 12. As shown, processes 40, 42 execute concurrently on computer 12, share resources in system 10A, and may communicate with one or more users 26. Computer 12 may comprise any type of general purpose/specific-use computerized system (e.g., a mobile phone, a handheld computer, a personal digital assistant, a portable (laptop) computer, a desktop computer, a workstation, a server, a mainframe computer, etc.). As shown, computer 12 generally includes a central processing unit (CPU) 14, memory 16, input/output (I/O) interface 18, bus 20, external I/O devices/resources 22, and a storage unit 24.

CPU 14 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Storage unit 24 may comprise any type of data storage for providing storage for information necessary to carry out the invention as described below. As such, storage unit 24 may include one or more storage devices, such as a magnetic disk drive or an optical disk drive. Moreover, similar to CPU 14, memory 16 and/or storage unit 24 may reside at a single physical location, comprising one or more types of data storage, or be distributed across a plurality of physical systems in various forms. Further, memory 16 and/or storage unit 24 can include data distributed across, for example, a LAN, WAN or a storage area network (SAN) (not shown).

I/O interface 18 may comprise any system for exchanging information to/from an external source. I/O devices 22 may comprise any known type of external device, including speakers, a CRT, LED screen, handheld device, keyboard, mouse, voice recognition system, speech output system, printer, monitor/display, facsimile, pager, etc. It is understood, however, that if computer 12 is a handheld device or the like, a display could be contained within computer 12, and not as an external I/O device 22 as shown. Bus 20 provides a communication link between each of the components in computer 12 and likewise may comprise any known type of transmission link, including electrical, optical, wireless, etc. In addition, although not shown, additional components, such as cache memory, communication systems, system software, etc., may be incorporated into computer 12.

Shown stored in memory 16 is a process management system 28 that manages processes 40, 42 executing on computer 12. Process management system 28 allocates resources to processes 40, 42, and executes each process 40, 42 using its allocated resources. To help ensure that each process 40, 42 remains responsive, for example, to user 26, process management system 28 attempts to allocate resources so that they are used most effectively. To this extent, process management system 28 is shown including a resource system 30, a benefit system 32, an allocation system 34, a status system 36, and an execution system 38. Operation of each of these systems will be discussed further below. While various systems are shown implemented as part of process management system 28, it is understood that some or all of the systems can be implemented independently, combined, and/or stored in memory for one or more separate computers 12 that communicate over a network.

Figure 3:
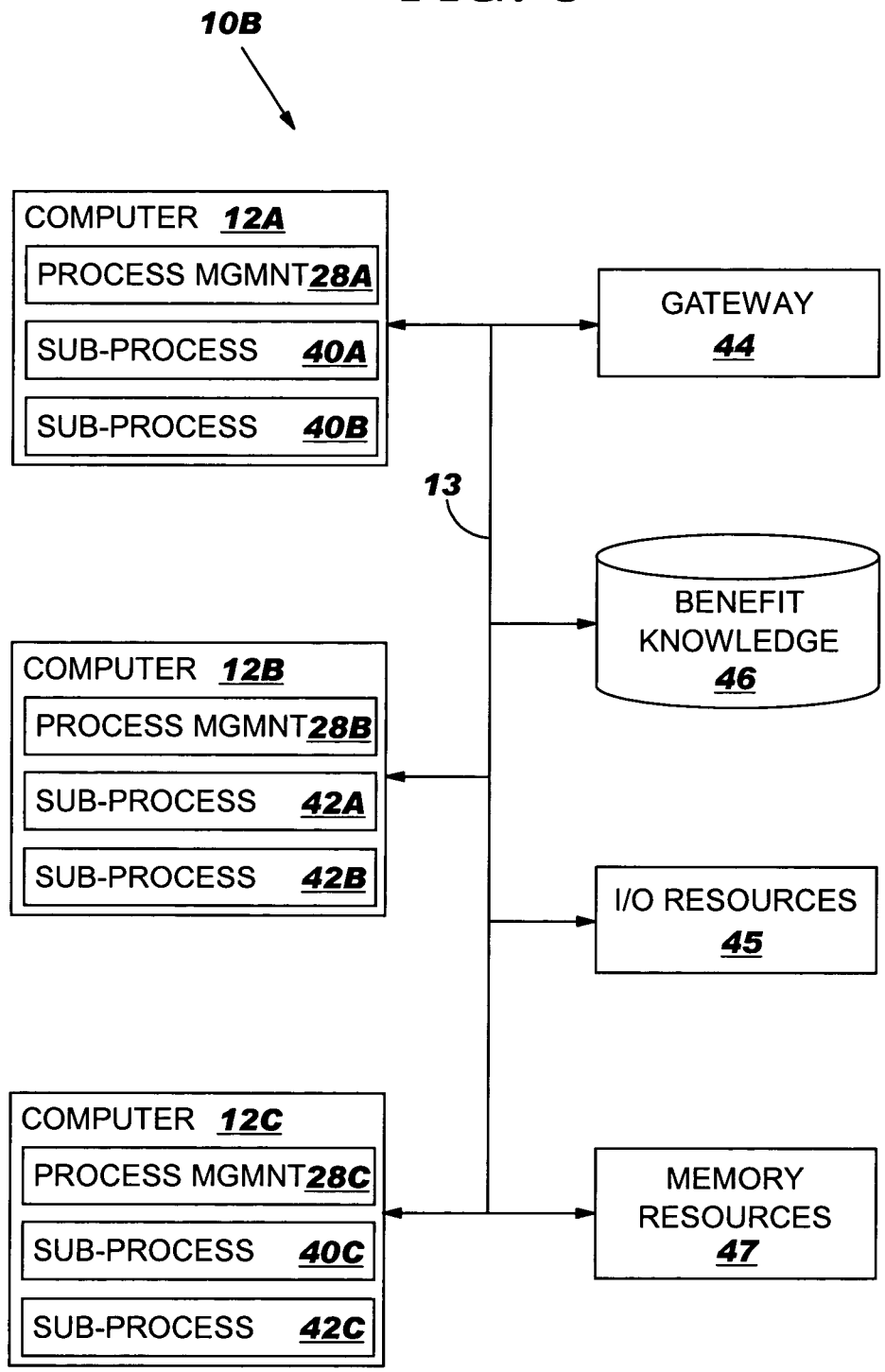
FIG. 3 shows another illustrative system for managing processes according to another embodiment of the invention.

FIG. 3 shows another illustrative system 10B for managing processes that includes three computers 12A-C that share resources. As depicted, computers 12A-C communicate with each other and various other systems 44, 45, 46, 47 via communications link 13. To this extent, communications link 13 can comprise any now known or later developed mechanism for such purposes, e.g., a direct hardwired connection (e.g., serial port), or another type of network connection. In the latter case, the network can comprise an addressable connection in a client-server (or server-server) environment that may utilize any combination of wireline and/or wireless transmission methods. In this instance, the server and client may utilize conventional network connectivity, such as Token Ring, Ethernet, WiFi or other conventional communications standards. Further, the network can comprise any type of network, including the Internet, a wide area network (WAN), a local area network (LAN), a virtual private network (VPN), etc. Where the client communicates with the server via the Internet, connectivity could be provided by conventional TCP/IP sockets-based protocol, and the client would utilize an Internet service provider to establish connectivity to the server.

As discussed, computers 12A-C share resources of system 10B such as, for example, communications link 13, I/O resources 45, and memory resources 47. Further, each computer 12A-C can include resources that are not shared by other computers 12A-C. For example, each computer 12A-C can include one or more CPUs 14 (FIG. 2) and/or an internal memory 16 (FIG. 2) that are only shared by processes executing on the particular computer 12A-C. However, it is understood that this is only illustrative, and various alternative configurations are possible, e.g., all resources could be shared by all computers 12A-C.

System 10B can include a gateway 44 to provide a central access point for receiving processes that are to be executed, and a process management system 28A-C implemented on each computer 28A-C for managing the execution of each process. In one embodiment, gateway 44 can receive a new process that is to be executed, and can determine the appropriate process management system(s) 28A-C to manage execution of the process. Gateway 44 can use any solution for providing a process to one or more process management systems 28A-C. For example, gateway 44 can select a process management system 28A-C that is managing the fewest number of processes. Alternatively, various computers 12A-C may be configured to run certain types of processes more efficiently. In this case, the process can be provided to the process management system 28A-C based on the type of process. In any event, once determined, gateway 44 can provide the new process to the particular process management system(s) 28A-C for execution.

As previously mentioned, each process management system 28A-C manages processes executing on the associated computer 12A-C. When a new process is received, process management system 28A-C can decide whether to execute the entire process (e.g., all sub-processes) or provide some or all of the sub-processes to one or more other process management systems 28A-C for execution. For example, gateway 44 could initially receive processes 40, 42 (FIG. 2). Gateway 44 can provide process 40 to process management system 28A, and process 42 to process management system 28B. As shown, each process 40, 42 can include three sub-processes 40A-C, 42A-C, respectively. Consequently, process management systems 28A-B can decide whether to execute all sub-processes, or provide one or more of the sub-processes to another process management system 28A-C. As illustrated, process management system 28A could execute sub-processes 40A-B, and provide sub-process 40C to process management system 28C, and process management system 28B could execute sub-processes 42A-B and provide sub-process 42C to process management system 28C. It is understood that while each process management system 28A-C is shown executing two sub-processes, any number of sub-processes can be concurrently managed by a particular process management system 28A-C. Further, it is understood that sub-processes 40A-C, 42A-C could also include sub-processes that could also be executed by the corresponding process management system 28A-C or provided to another process management system 28A-C for execution.

Prior to executing a process (or sub-process), one or more resources must be allocated to the process. Consequently, each process management system 28A-C can include a resource system 30 (FIG. 2) for determining an availability for each shared resource, and an allocation system 34 (FIG. 2) for allocating available resources to each process. To this extent, resource system 30 can determine a set of available resources in system 10B and forward the set of available resources to allocation system 34. Allocation system 34 can use the set of required resources in the process definition to determine resources that the process requires, and can allocate the required resources to the process from within the set of available resources. If all resources in the set of required resources for a process are not available, allocation system 34 can allocate some of the resources and wait for the remaining resources to become available, can wait for all of the set of required resources to be available at once, or some combination thereof. In any event, once allocation system 34 allocates the set of required resources for a process, the process can be executed.

In order to execute a process (or sub-process), each process management system 28A-C can include an execution system 38 (FIG. 2) for executing each process using its allocated resources. Execution system 38 can manage the scheduling of the various resources, swapping of processes, etc. as is known in the art. Once a process has executed, execution system 38 can provide the results of the execution to the appropriate process management system 28A-C. For example, once sub-process 40C has executed, execution system 38 in process management system 28C can provide the results to process management system 28A that is managing execution of the entire process 40 (FIG. 2).

As noted, each process (and sub-process) can include a desired execution period. To this extent, any lag time can also be made known to process management system 28A-C along with a process to be executed. The lag time can comprise a positive or negative amount of time that indicates whether the particular process is being executed behind schedule (lagging) or ahead of schedule (accelerated). For example, sub-process 40A may initially have a lag time of zero since it is one of the initial sub-processes executed for process 40 (FIG. 2). However, one or more required resources may not be immediately available, or the execution may take longer than expected. Consequently, the execution of sub-process 40A could complete late. Alternatively, the execution of sub-process 40A may proceed faster than anticipated, and the execution could complete early.

In any event, the difference between the actual execution time and the desired execution period can be reported as a lag time along with the execution results, and passed on to process management systems 28A-C that are executing other sub-process(es) after sub-process 40A has completed execution. In one embodiment, the execution time and/or lag time can be carried in band along with the execution result(s) from one sub-process to another sub-process. This data could represent the overall lag/speedup of the process to which the sub-processes belong. In this case, any additional overhead to maintain performance data of a process whose constituent sub-processes can be executed at different points in a distributed system would not be required. This would decrease the overhead for performance data management.

After all required resources have been allocated to one or more processes, one or more additional resources may remain available. Instead of allowing these resources to remain unused, additional resources can be allocated to one or more of the processes. In order to allocate the additional resources in the set of available resources more effectively, each process management system 28A-C can include a benefit system 32 (FIG. 2) for determining an anticipated benefit for one or more processes. The anticipated benefit can be based on learned benefit knowledge for the process that can be stored, for example, in a knowledge database 46. As shown, all benefit systems 32 can collectively maintain and access a benefit knowledge database 46 for the various processes. Alternatively, each benefit system 32 can maintain its own benefit knowledge database 46 on, for example, a storage unit 24 (FIG. 2) that is part of each computer 12A-C, and periodically synchronize with benefit knowledge databases 46 of other benefit systems 32. Still further, a combination of the two alternatives can be used in which each benefit system 32 maintains a local benefit knowledge database 46 that is used during peak times to improve performance, and is periodically synchronized with a shared benefit knowledge database 46 to update the entries.

In any event, when a process finishes executing, execution system 38 (FIG. 2) can return the actual execution time for the process. Benefit system 32 (FIG. 2) can determine the benefit in execution time that the process derived from a set of additional resources. For example, benefit system 32 can compare the actual execution time for the process with the desired execution period specified in the process definition. The benefit can then be stored as an entry in the benefit knowledge database 46.

FIG. 4 shows an illustrative set of entries 48A-D stored in benefit knowledge database 46. As shown, each entry 48A-D can include a unique identifier for the process 50, an amount of additional resources 52A-C that was allocated for each resource, and a performance improvement 54 that occurred based on the corresponding amounts of additional resources 52A-C. Performance improvement 54 can be stored as a relative performance increase/decrease (e.g., as a percentage) that the process experienced when allocated the corresponding amounts of additional resources 52A-C. In this case, the allocation of additional resources to a process can be based on an anticipated relative performance change that the process should experience rather than on an actual time difference that may be obtained. Further, one or more entries 48A-D may represent allocations that resulted in poorer performance. These entries 48A-D can be used to avoid allocating a similar set of additional resources 52A-C so that a similar poorer performance would be less likely to occur.

Alternatively, when entries 48A-D are subsequently obtained, performance improvement 54 and the desired execution period can be used to obtain the actual execution time and/or an anticipated time savings for entry 48A-D. For example, performance improvement 54 can be calculated by dividing the desired execution period by the actual execution time and converting the result to a percentage. In this case, a performance improvement 54 that is less than 100% (e.g., performance improvement of 50% for entry 48D) would represent a poorer performance, while a performance improvement 54 greater than 100% would represent an improved performance. The actual execution time can be subsequently determined by dividing the desired execution period by performance improvement 54. Additionally, the difference between the actual execution time and the desired execution period can be used as the anticipated time savings for entry 48A-D. For example, if process 40B has a desired execution period of twelve seconds, then the actual execution time for entry 48B would comprise approximately eight seconds (e.g., 12/150%), and the anticipated time savings would comprise four seconds (e.g., 12−8). However, it is understood that performance improvement 54, the actual execution time, and the anticipated time savings can be stored and calculated in any manner. Additionally, each entry 48A-D could include any combination of the three values. Still further, it is understood that rather than storing amounts of additional resources 52A-C, each entry 48A-D could store the actual amount of resources allocated.

As noted, when a set of available resources can be allocated to any process, benefit system 32 (FIG. 2) can use benefit knowledge database 46 to determine an anticipated benefit for one or more processes. In particular, benefit system 32 can query benefit knowledge database 46 to obtain one or more entries 48A-D that comprise learned benefit knowledge for a process. Benefit system 32 can limit the returned entries 48A-D to only those entries that have amounts of resources 52A-C that are all equal to or less than the currently available set of available resources. For example, if the set of available resources includes nine units of resource A, entry 48D might not be returned for sub-process 40A (FIG. 3) since an additional ten units of resource A were allocated for entry 48D.

Benefit system 32 (FIG. 2) can determine an anticipated benefit for a process based on the performance improvement(s) 54 for one or more returned entries 48A-D. Various solutions for determining the anticipated benefit can be implemented. For example, the maximum performance improvement 54 could be returned, the smallest amount of resources 52A-C providing a threshold performance improvement 54 could be used, the various performance improvements 54 could be averaged, etc. In any event, once an anticipated benefit is determined for each process, allocation system 34 (FIG. 2) can allocate the set of available resources to one or more of the processes. For example, allocation system 34 can determine a process that has been most responsive for the set of available resources (e.g., has the highest anticipated benefit), and can allocate the set of available resources to that process.

When no entries are returned for a process in benefit knowledge database 46 (e.g., the process has not yet been executed in system 10B), benefit system 32 (FIG. 2) can predict an anticipated benefit for a process. In one embodiment, benefit system 32 can extrapolate the set of required resources for a process, and assume that additional resources allocated in roughly the same ratio would provide a roughly linear performance improvement. For example, sub-process 40A may indicate that it requires fifty units of resource A and ten units of resource B. If twenty-five units of each resource is available, benefit system 32 can predict that if sub-process 40A receives twenty-five units of resource A and five units of resource B, a performance improvement of approximately 150% would be realized (e.g., 75 total units/50 required units). As a result, an anticipated benefit of 150% could be provided for sub-process 40A.

Allocation system 34 (FIG. 2) can consider all processes sharing the set of available resources, or only some of the processes when allocating the set of available resources. For example, only those processes that are lagging may be considered for the set of available resources. To this extent, each process management system 28A-C can include a status system 36 (FIG. 2) for determining a status of each process that is being executed. In one embodiment, status system 36 uses the lag time that is provided along with each process to determine whether the process is lagging or accelerated. For example, a positive lag time could indicate that the process is lagging, and a negative lag time could indicate that the process is accelerated. Once the set of lagging processes is determined, status system 36 can forward the set of lagging processes to benefit system 32, which determines an anticipated benefit for each lagging process. The set of lagging processes and corresponding anticipated benefits can be provided to allocation system 34 for allocation of the set of available resources.

Allocation system 34 (FIG. 2) may also consider processes in a set of accelerated processes for losing one or more allocated resources. In this case, status system 36 (FIG. 2) can provide allocation system 34 with a set of accelerated processes. Allocation system 34 can determine the additional resources, if any, that have been allocated to each process in the set of accelerated processes. If an accelerated process has additional resources that are not otherwise available, and the anticipated benefit for a lagging process is sufficient, allocation system 34 could reallocate the additional resources from the accelerated process to the lagging process.

Alternatively, the set of accelerated processes may be considered to receive additional resources. For example, benefit system 32 (FIG. 2) could determine the anticipated benefits for all processes, and status system 36 (FIG. 2) could determine the status for each process. Allocation system 34 (FIG. 2) could initially consider the lagging processes in the set of lagging processes to receive the set of available resources. However, the anticipated benefits for the lagging processes may not meet a threshold amount. In this case, allocation system 34 can consider the accelerated processes in the set of accelerated processes to receive the set of available resources. If an accelerated process has a sufficient anticipated benefit, the set of available resources can be allocated to the accelerated process. For example, allocation system 34 can determine an accelerated process that has been most responsive for the set of available resources (e.g., has the highest anticipated benefit), and can allocate the set of available resources to that accelerated process. As a result, the accelerated process should complete faster, and all of the resources allocated to the accelerated process would become available sooner to the set of lagging processes.

Additionally, allocation system 34 may consider the amount and/or type of resources that are allocated to each process in the set of accelerated processes. For example, one or more accelerated processes may have a resource that is currently unavailable, and is required to provide a substantial benefit to one or more lagging processes. In this case, these accelerated processes can be given a priority for receiving the set of available resources so that the unavailable resource will become available sooner. It is understood that processes that are neither lagging nor accelerated (e.g., a new process or an on schedule process) could be included in either the set of accelerated processes or the set of lagging processes.

Allocation system 34 (FIG. 2) can consider other factors before allocating a set of available resources to one or more processes. For example, in addition to the anticipated benefit, the desired execution period for each process can be considered. If the anticipated benefit for two or more processes are roughly the same, then the process that has the longest desired execution period could be selected to receive the set of available resources. This selection should provide the maximum amount of time saved as a result of the allocation. Alternatively, allocation system 34 can translate the anticipated benefit (in percentage) into an anticipated time savings before allocating a set of available resources based on the anticipated time savings.

Additionally, allocation system 34 (FIG. 2) can also consider a minimum set of additional resources that is required for an anticipated benefit. For example, two processes, P1 and P2, may have anticipated benefits that are the same or nearly the same for a set of available resources. However, process P1 may require fewer resources in the set of available resources for the anticipated benefit than process P2. In this case, allocation system 34 can allocate the smaller amount of available resources to process P1 since it uses fewer resources.

Figure 5:
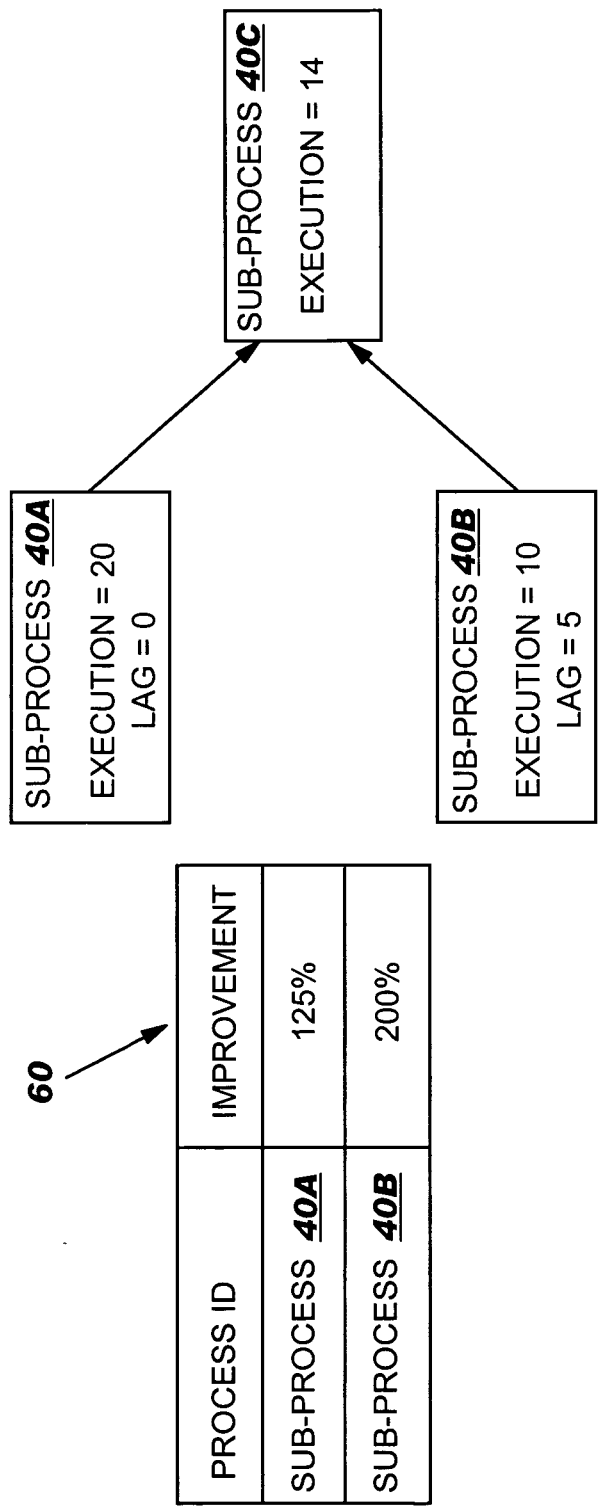
FIG. 5 shows illustrative sub-processes of a process according to one embodiment of the invention.

Still further, allocation system 34 (FIG. 2) can determine and consider a performance benefit for a process when selecting between sub-processes of the process. For example, FIG. 5 shows an illustrative situation in which two sub-processes 40A-B of process 40 (FIG. 2) are considered to receive a set of available resources. Based only on the lag times, sub-process 40B would be allocated the set of available resources since it is lagging while sub-process 40A is not. Further, based on anticipated improvements 60, sub-process 40B would be allocated the set of available resources since it has a higher anticipated improvement 60. Still further, based on the amount of time saved, sub-process 40B would be allocated the set of available resources since doing so should save five seconds versus four seconds for sub-process 40A. However, allocation system 34 can recognize that sub-process 40C cannot execute until both sub-processes 40A-B have completed. Since the desired execution period for sub-process 40A is longer, improving the performance of sub-process 40B would provide no performance benefit to process 40. As a result, the set of available resources could be allocated to sub-process 40A so that process 40 receives a corresponding performance benefit.

While the invention is shown and discussed with reference to deciding which process will be allocated a set of available resources, the invention can also be applied to selecting between two or more sets of available resources. For example, resource system 30 (FIG. 2) may determine that it could obtain either a first set of available resources or a second set of available resources. In this situation, benefit system 32 (FIG. 2) can determine anticipated benefits for the various processes for both sets of available resources. Subsequently, allocation system 34 (FIG. 2) can select both the set of available resources and the process that will have these resources allocated to it based on the anticipated benefits.

It is understood that while the various features of the invention are shown and discussed with reference to allocating additional resources to one or more processes, the invention can also be used to allocate fewer resources than the set of required resources for one or more processes. For example, when a set of required resources are not available for a process, allocation system 34 (FIG. 2) can allocate the resources that are available to the process, and execution system 38 (FIG. 2) can start executing the process with the fewer resources. Subsequently, benefit system 32 (FIG. 2) can add an entry 48A-D (FIG. 4) that has a negative value for one or more amounts of resources 52A-C (FIG. 4), and a likely detriment in the actual execution time stored as a performance improvement 54 (FIG. 4). The performance information for a process when allocated fewer resources can be used to determine an anticipated detriment that would occur to the process execution should, for example, one or more resources be reallocated to a lagging process. To this extent, it is understood that the anticipated benefit could comprise a detriment or an improvement in execution.

Further, it is understood that the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer (e.g., a finite state machine), containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method, performed by a computer hardware system, of managing a set of processes and a set of resources within the computer hardware system, comprising:
    identifying, from the set of processes within the computer hardware system, a plurality of lagging processes;
    identifying, from the set of resources within the computer hardware system, a plurality of available resources that are available for use by the plurality of lagging processes;
    calculating, for a particular one of the plurality of lagging processes, a calculated benefit to be realized upon a particular one of the plurality of available resources being assigned to the particular one of the plurality of lagging processes, the benefit being calculated based on actual performance improvements that were obtained from one or more previous allocations of the same or similar set of available resources to the particular process;
    comparing the calculated benefit for the particular one of the plurality of lagging processes with other calculated benefits for others of the plurality of lagging processes being assigned the particular one of the plurality of available resources; and
    assigning, within the computer hardware system and based upon the comparing, the particular one of the plurality of available resources to a selected one of the lagging processes.

2. The method of claim 1, wherein
the selected one of the lagging processes is a most responsive process to the particular one of the plurality of available resources.

3. The method of claim 1, further comprising
executing the selected one of the lagging processes using the particular one of the plurality of available resources.

4. The method of claim 1, further comprising
identifying, from the set of processes within the computer hardware system, an accelerated process; and
reassigning a resource, from the accelerated process, to the selected one of the lagging processes.

5. The method of claim 1, wherein
the calculating is based upon a benefit knowledge database.

6. The method of claim 1, wherein
the calculated benefit for the particular one of the plurality of lagging processes includes a calculated saved time between
    (i) the particular one of the plurality of lagging processes being assigned the particular one of the available resources, and
    (ii) the particular one of the plurality of lagging processes not being assigned the particular one of the available resources.

7. A computer hardware system for managing a set of processes and a set of resources within the computer hardware system, comprising:
    at least one processor, the at least one processor including
    a process module configured to identify, from the set of processes within the computer hardware system, a plurality of lagging processes;
    a resource module configured to identify, from the set of resources within the computer hardware system, a plurality of available resources that are available for use by the plurality of lagging processes;
    a benefit module configured to calculate, for a particular one of the plurality of lagging processes, a calculated benefit to be realized upon a particular one of the plurality of available resources being assigned to the particular one of the plurality of lagging processes, the benefit being calculated based on actual performance improvements that were obtained from one or more previous allocations of the same or similar set of available resources to the particular process;
    an allocation module configured to
        perform a comparison between the calculated benefit for the particular one of the plurality of lagging processes and other calculated benefits for others of the plurality of lagging processes being assigned the particular one of the plurality of available resources; and
        assign, within the computer hardware system and based upon the comparison, the particular one of the plurality of available resources to a selected one of the lagging processes.

8. The computer hardware system of claim 7, wherein
the selected one of the lagging processes is a most responsive process to the particular one of the plurality of available resources.

9. The computer hardware system of claim 7, wherein
the at least one processor includes an execution module configured to execute the selected one of the lagging processes using the particular one of the plurality of available resources.

10. The computer hardware system of claim 7, wherein
the process module is configured to identify, from the set of processes within the computer hardware system, an accelerated process; and the allocation module is configured to reassign a resource, from the accelerated process, to the selected one of the lagging processes.

11. The computer hardware system of claim 7, further comprising a benefit knowledge database, wherein
the benefit module is coupled to the benefit knowledge database and calculates the calculated benefit utilizing the benefit knowledge database.

12. The computer hardware system of claim 7, wherein
the calculated benefit for the particular one of the plurality of lagging processes includes a calculated saved time between
(i) the particular one of the plurality of lagging processes being assigned the particular one of the available resources, and
(ii) the particular one of the plurality of lagging processes not being assigned the particular one of the available resources.

13. A computer-readable storage device having stored therein computer usable program code for managing a set of processes and a set of resources within a computer hardware system, the computer usable program code, when executed by the computer hardware system, causing the computer hardware system to perform:
identifying, from the set of processes within the computer hardware system, a plurality of lagging processes;
identifying, from the set of resources within the computer hardware system, a plurality of available resources that are available for use by the plurality of lagging processes;
calculating, for a particular one of the plurality of lagging processes, a calculated benefit to be realized upon a particular one of the plurality of available resources being assigned to the particular one of the plurality of lagging processes, the benefit being calculated based on actual performance improvements that were obtained from one or more previous allocations of the same or similar set of available resources to the particular process;
comparing the calculated benefit for the particular one of the plurality of lagging processes with other calculated benefits for others of the plurality of lagging processes being assigned the particular one of the plurality of available resources; and
assigning, within the computer hardware system and based upon the comparing, the particular one of the plurality of available resources to a selected one of the lagging processes.

14. The computer-readable storage device of claim 13, wherein
the selected one of the lagging processes is a most responsive process to the particular one of the plurality of available resources.

15. The computer-readable storage device of claim 13, further comprising
executing the selected one of the lagging processes using the particular one of the plurality of available resources.

16. The computer-readable storage device of claim 13, further comprising
identifying, from the set of processes within the computer hardware system, an accelerated process; and
reassigning a resource, from the accelerated process, to the selected one of the lagging processes.

17. The computer-readable storage device of claim 13, wherein
the calculating is based upon a benefit knowledge database.

18. The computer-readable storage device of claim 13, wherein
the calculated benefit for the particular one of the plurality of lagging processes includes a calculated saved time between
(i) the particular one of the plurality of lagging processes being assigned the particular one of the available resources, and
(ii) the particular one of the plurality of lagging processes not being assigned the particular one of the available resources.

* * * * *